Dec. 24, 1929.　　　　L. R. MILLER　　　　1,740,519
MOLDBOARD ATTACHMENT
Filed Feb. 5, 1929
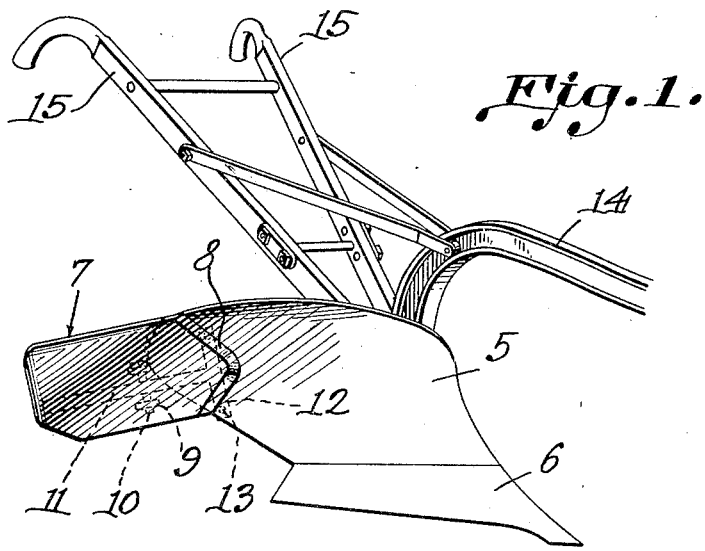
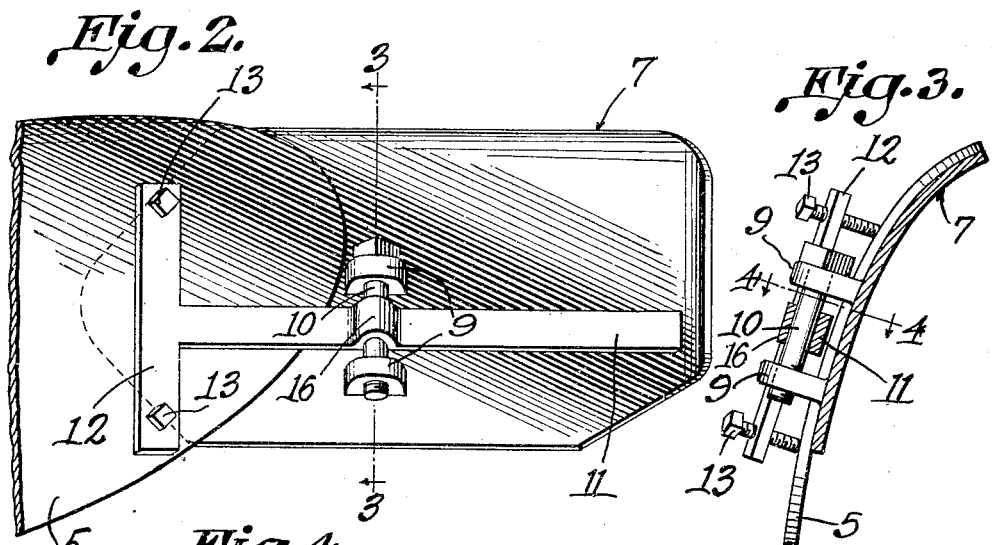
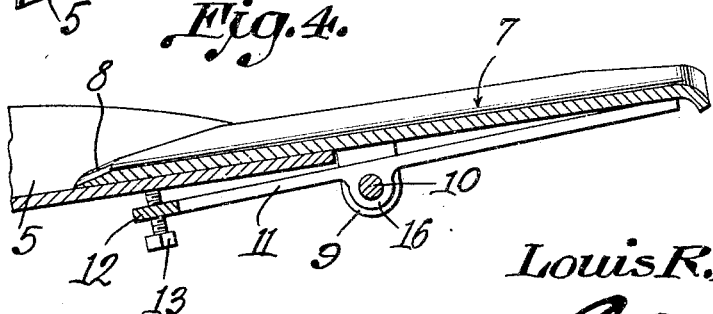
Louis R. Miller, Inventor
By C. A. Snow & Co.
Attorneys.

Patented Dec. 24, 1929

1,740,519

UNITED STATES PATENT OFFICE

LOUIS R. MILLER, OF NORWALK, WISCONSIN

MOLDBOARD ATTACHMENT

Application filed February 5, 1929. Serial No. 337,671.

This invention relates to plows, and aims to provide novel means whereby the usual plow may be converted into a sod cutting plow or a plow especially adapted for side hill plowing.

The primary object of the invention is to provide an attachment in the form of an auxiliary mold board, novel means being provided for securing the auxiliary mold board to the mold board of the plow to widen the usual mold board to cause the sod cut by the plow to fall away from the plow when the plow is in operation.

A further object of the invention is to provide means for securing the auxiliary mold board so that the auxiliary mold board may be adjusted to various angles, the securing means being such as to permit the application of the auxiliary mold board without the necessity of forming bolt holes in the mold board.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a perspective view of a plow showing an attachment constructed in accordance with the invention, as secured to the mold board thereof.

Figure 2 is a rear elevational view showing the attachment secured to the mold board of a plow.

Figure 3 is a sectional view taken on line 3—3 of Figure 2.

Figure 4 is a sectional view taken on line 4—4 of Figure 3.

Referring to the drawing in detail, the reference character 5 designates the mold board of a plow and the reference character 6 designates the plow share secured at the lower edge thereof.

The auxiliary mold board forming the essence of the present invention is indicated by the reference character 7, and as shown is in the form of a wide blade curved in such a way that when it is positioned against the mold board of a plow, the curvature of the mold board of the plow will be carried out, lengthening the usual mold board to cause the sod to curl away from the mold board.

The forward end of the auxiliary mold board 7 tapers as shown at 8, the forward end being beveled eliminating a shoulder at the point of contact with the main mold board so that the sod or material plowed will not be obstructed as the sod or material is turned outwardly as it moves over the mold board.

Formed integral with the mold board 7, and extending from the rear surface thereof are the spaced ears 9 which are formed with openings to receive the bolt 10, the openings in the ears being so arranged that the bolt 10 is disposed in spaced relation with the rear surface of the mold board 7 providing a clearance to receive the arm 11 of the attaching device.

This arm 11 is substantially long and is provided with a transversely disposed end bar 12 formed integral therewith, the end bar 12 having threaded openings disposed adjacent to the ends thereof, which openings accommodate the bolts 13 that have their free ends engaging the outer surface of the mold board 5 in such a way as to set up a binding action between the arm 11, bolt 10, bolts 13 and mold boards associated therewith.

The arm 11 is provided with an enlargement 16 disposed intermediate its ends, the enlargement having an opening to receive the bolt 10 to the end that movement of the arm 11 is prevented.

From the foregoing it will be obvious that due to this construction, the auxiliary mold board may be readily secured to the mold board of a plow, and may be adjusted to various angles to adapt the plow for use in plowing soil under various conditions.

The reference character 14 represents the plow beam to which the draft animals or other power device is attached. Handles 15 also form a part of the plow and afford means for guiding the plow through the ground surface.

I claim:

1. In combination with the mold board of a plow, an auxiliary mold board, spaced ears extending from the rear surface of the auxiliary mold board, said ears having openings, a bolt extended through the openings, a clamp including an arm positioned under the bolt and having one end thereof engaging the auxiliary mold board, a cross bar formed at the other end of the arm, and adjusting bolts extended through the cross bar and engaging the mold board of the plow to force the arm outwardly and set up a binding action between the mold boards and first mentioned bolt.

2. In combination with the mold board of a plow, an auxiliary mold board, an arm pivotally connected to the auxiliary mold board, the ends of the arm extending beyond the pivot point of the arm, one end of the arm engaging the auxiliary mold board, the opposite end of the arm engaging the mold board of the plow, and adjustable means carried by the arm and engaging the mold board of the plow for setting up a binding action between the mold board and arm to support the auxiliary mold board on the plow.

In testimony that I claim the foregoing as my own, I have hereto affixed my signature.

LOUIS R. MILLER.